United States Patent [19]

Lord et al.

[11] Patent Number: 5,002,994

[45] Date of Patent: Mar. 26, 1991

[54] PHENOLIC MOULDING COMPOSITIONS

[75] Inventors: Allan Lord, Littleborough; Kenneth Knight, Sandiway, both of United Kingdom

[73] Assignees: TBA Industrial Products Ltd., Manchester; Hepworth Minerals & Chemicals, Cheshire, both of England

[21] Appl. No.: 349,307

[22] Filed: May 9, 1989

[30] Foreign Application Priority Data

May 26, 1988 [GB] United Kingdom ................ 8812512

[51] Int. Cl.$^5$ ........................... C08K 7/14; C08K 3/26
[52] U.S. Cl. ................................. 524/425; 524/433; 524/541
[58] Field of Search ................. 524/425, 541, 433; 525/501

[56] References Cited

U.S. PATENT DOCUMENTS

| | | | |
|---|---|---|---|
| 3,410,718 | 11/1968 | Smith | 525/501 |
| 4,426,484 | 1/1984 | Saeki et al. | 524/541 |
| 4,526,924 | 7/1985 | Korb et al. | 524/541 |
| 4,894,292 | 1/1990 | Dibuz et al. | 524/425 |

FOREIGN PATENT DOCUMENTS

0180257 of 1986 European Pat. Off. .

*Primary Examiner*—Lewis T. Jacobs
*Attorney, Agent, or Firm*—Nixon & Vanderhye

[57] ABSTRACT

A phenolic moulding composition in solid form, such as a dough moulding composition or sheet moulding composition, comprises a phenol formaldehyde novolak resin; a phenol formaldehyde resole resin as cross linking agent for the novolak resin; fibrous reinforcement; and non-fibrous particulate filler in an amount greater than the combined amount of the novolak and resole resins; the weight proportions of the ingredients being in the ranges

| | |
|---|---|
| phenolic resins | 20–40% |
| fibrous reinforcement | 20–50% |
| non-fibrous particulate filler | 25–50% |

Articles moulded from the compositions under heat and pressure have the flexural strength and impact strength required in certain precision parts for the automotive and engineering industries.

8 Claims, No Drawings

PHENOLIC MOULDING COMPOSITIONS

This invention relates to phenolic moulding compositions, and in particular to dough moulding compositions, sheet moulding compositions and like compositions in solid form, mouldable under heat and pressure and comprising a phenol formaldehyde resin, fibrous material to reinforce an article moulded from the composition, and non-fibrous particles of filler.

There are described in EP-A-020 102 certain phenolic dough moulding compositions suitable by curing under heat and pressure for the manufacture of building products, and in particular roofing tiles which match the properties of natural slate tiles. These compositions comprise 55–90% by weight of inorganic mineral filler (this is essentially non-fibrous particulate material), 10–30% by weight of a phenolic resin mixture consisting of a resole resin in liquid form and a novolak resin, and mineral or plastics fibres (these function as reinforcement). The mineral filler is preferably slate powder, and the fibres are preferably glass fibres, which may form from 0.5 to 15% and preferably 2.5% by weight of the composition.

An attractive feature of the compositions of EP-A-020 102 is that the weight proportion of resin:non-fibrous particulate filler (the resin being the expensive ingredient) is relatively low, being less than 1:1. They are, however, unsuited to the manufacture of precision moulded articles for the automotive and engineering industries, and have relatively low flexural strength and impact strength.

According to the invention there is provided a phenolic moulding composition in solid form comprising a phenol formaldehyde novolak resin; a phenol formaldehyde resole resin as cross-linking agent for the novolak resin; fibrous reinforcement; and non-fibrous particulate filler in an amount greater than the combined amounts of the novolak and resole reins; the weight proportions of the ingredients being in the ranges

| phenolic resins | 20–40% |
| fibrous reinforcement | 20–50% |
| non-fibrous particulate filler | 25–50% |

A resole resin is a thermosetting resin obtained by the base-catalysed reaction of a phenol (usually phenol $C_6H_5OH$ itself, but alternatively a substituted phenol such as m-cresol) and formaldehyde in a molar ratio 1:1–3.

A novolak resin is a thermoplastic resin obtained by the reaction (usually acid-catalysed) of a phenol or substituted phenol and formaldehyde in a molar ratio 1:0.5–1.

Preferably the weight proportion of novolak:resole in the composition is in the range 70:30–20:80, particularly 55:45–65:35. The preferred molar proportions of phenol:formaldehyde in the novolak and resole ingredients are respectively 1:0.7–0.9 and 1:1.3–2.5. Since the resole acts as cross-linker for the novolak, there is no need for such formaldehyde-generants as hexamine and paraform.

The reinforcing fibre employed may for example be of carbon, graphite, ceramics, polyester, aramid or polyacrylonitrile, but is preferably glass fibre. The reinforcing fibre preferably forms not less than 25% by weight of the composition.

The non-fibrous particulate filler may similarly be any that is conventional in this field, such as mica, silica, carbon black, graphite, talc, alumina, microspheres (e.g. of glass) and calcium carbonate.

Preferably, to avoid phase separation during moulding, an alkaline earth metal oxide or hydroxide, such as the oxide or hydroxide of calcium or magnesium, is included in the composition.

The composition may include a shelf-life extender, such as a phthalate ester (e.g. dibutyl phthalate) or tricresyl phosphate; and a halogen compound of the type used to reduce the spread of flame e.g. tris (dibromopropyl) phosphate, may also be added.

In some circumstances, as when the weight proportion of novolak:resole in a dough moulding composition is at the upper end of the range indicated earlier, it may be desirable to include in the composition a small proportion, up to about 3% by weight on the novolak ingredient, of a reactive viscosity modifier. Such a material, for example benzyl alcohol, has the effect of reducing the viscosity of the novolak ingredient and so of reducing the energy required during mixing of the ingredients of the composition. During moulding, the modifier reacts with the phenolic resin ingredients.

The invention is further illustrated by the following Examples.

EXAMPLE 1

This Example describes the preparation of a novolak resin suitable for use in a moulding composition.

Phenol (94 g; 1 mole), aqueous formaldehyde solution (37% by weight; 65.2 g; 0.8 mole) and oxalic acid (0.0125 g; catalyst) were heated under reflux at 100° C. for 1 hour. Water was then distilled off under reduced pressure to leave a product of viscosity in the range 8–12 poise (0.8–1.2 Pa s) at 50° C., which was then cooled rapidly. Benzyl alcohol (0.05 g:reactive viscosity modifier) was then added. The solids content of the resin (assessed from weight loss during 1 hour at 135° C.) was 85%.

EXAMPLE 2

This Example describes the preparation of a resole resin suitable as cross-linking agent for the novolak of Example 1.

Phenol (94 g; 1 mole), aqueous formaldehyde solution (37%; 162.6 g; 2 moles) and 32% aqueous sodium hydroxide (7.5 g; catalyst) were heated under reflux under reduced pressure until the reactor contents were (at 25° C.) not dilutable with water beyond 1 part by weight of product:6 parts by weight of water without opalescence.

The mass was then heated under reduced pressure at a temperature not above 60° C. to distill off water until the viscosity at 25° C. was in the range 40–70 poise (4–7 Pa s). The solids content of the resin was 80% (135° C.); its pH was 9.0; and its cure time at 130° C. was 4.5 mins.

EXAMPLE 3

This Example describes the preparation of a dough moulding composition utilising the novolak of Example 1 and, as cross-linker for it, the resole of Example 2.

The following ingredients were intimately mixed over a period of 0.5 hours in a high-shear Z-blade mixer, in the weight proportions shown.

| Novolak | 16.9% |

| -continued | |
|---|---|
| Resole | 11.3% |
| Limestone (filler; passing 5 μm sieve) | 40.0% |
| Magnesium oxide | 0.5% |
| Zinc stearate (internal mould release agent) | 0.6% |
| Glass fibre (diameter 13 μm; length 13 mm) | 29.4% |
| Diethylene glycol (shelf life extender) | 1.3% |
| | 100.0% |

The resulting dough was packed in polythene bags.

EXAMPLE 4

This Example illustrates the use of the product of Example 3.

A predetermined weight of the product is charged to a matched die compression mould pre-heated to 150°–170° C. in a compression press, and a pressure in the range 0.25–4 tons/in$^2$ (400–6400 tonnes/m$^2$) is applied for a time which depends on the thickness of the article being moulded. A moulding time of 1–2 mins/mm of thickness is usual. The moulded article is removed hot from the mould.

Typical properties of an article (3mm thickness) moulded as above were:

| | | |
|---|---|---|
| Tensile strength | MPa | 30 |
| Tensile modulus | GPa | 9 |
| Flexural strength | MPa | 75 |
| Flexural modulus | GPa | 9 |
| Impact strength (notched Izod) | J/m | 50 |
| Specific gravity | | 1.85 |
| Water absorption (% by weight in 24 hours) | | 0.15 |

Material with the above properties is specially suitable in the manufacture of articles such as heatshields for automotive and mass transit applications.

EXAMPLE 5

A sheet moulding composition can be prepared from ingredients identical with those used in Example 4 but using glass fibre of length 25mm instead of 13mm. The procedure followed (conventional apart from the composition employed)is:

A mix of all the ingredients except for the glass fibre is prepared, and half of the mix is poured onto a thin thermoplastic sheet (polyethylene). The glass fibres are laid uniformly on top of the 'half-mix', whereupon the other half of the mix is poured over the glass fibres. The whole is then covered with a second polyethylene sheet, and the sandwich is passed between rollers to consolidate it.

For use, the thermoplastic sheets are stripped from the product, which is then cut into pieces and moulded to give a flow ratio in the range 3:1–9:1. Typical properties of an article moulded from the sheet moulding composition are:

| | | |
|---|---|---|
| Tensile strength | MPa | 70 |
| Tensile modulus | GPa | 9.5 |
| Flexural strength | MPa | 155 |
| Flexural modulus | GPa | 9.0 |
| Izod impact strength | J/m | 550 |
| Elongation at break, % | | 1.1 |
| Specific gravity | | 1.85 |

We claim:

1. A phenolic moulding composition in solid form comprising a phenol formaldehyde novolak resin; a phenol formaldehyde resole resin as a cross-linking agent for the novolak resin; fibrous reinforcement; and a non-fibrous prticulate filler in an amount greater than the combined amounts of the novolak and resole resins; the weight proportions of the ingredients being in the ranges

| | |
|---|---|
| phenolic resins | 20–40% |
| fibrous reinforcement | 20–50% |
| non-fibrous particulate filler | 25–50% | and the weight proportion on novolak:resole being in the range 70:30 –20:80.

2. A composition according to claim 1, in which the weight proportion of novolak:resole is in the range 55:45–65:35.

3. A composition according to claim 1, in which the fibrous reinforcement is glass fibre.

4. A composition according to claim 1, in which the non-fibrous particulate filler is calcium carbonate.

5. A composition according to claim 1, which contains an alkaline earth metal oxide hydroxide.

6. A composition according to claim 5, in which said alkaline earth metal compound is magnesium oxide.

7. A composition according to claim 1 which includes a reactive viscosity modifier.

8. An article moulded under heat and pressure from a composition according to claim 1.

* * * * *